UNITED STATES PATENT OFFICE.

HAROLD S. BOOTH AND GEORGE G. MARSHALL, OF CLEVELAND, OHIO.

PROCESS OF RECOVERING BERYLLIUM FROM ORES, MINERALS, &c., CONTAINING THE SAME.

1,392,045.   Specification of Letters Patent.   Patented Sept. 27, 1921.

No Drawing.   Application filed November 26, 1917.   Serial No. 204,004.

*To all whom it may concern:*

Be it known that we, HAROLD S. BOOTH and GEORGE G. MARSHALL, citizens of the United States, and residents, respectively, of Cleveland, in the county of Cuyahoga and State of Ohio, and Cleveland, in the county of Cuyahoga and State of Ohio, have invented a certain new and useful Improvement in Processes of Recovering Beryllium from Ores, Minerals, &c., Containing the Same, of which the following is a full, clear, and exact description.

This invention relates to a process more particularly directed toward the recovery of beryllium from such ores, minerals, and other material in which it may occur.

The most usual form in which beryllium is found in nature is in the mineral beryl, which is usually expressed by the formula $Be_3Al_2(SiO_3)_6$, and the various reactions which will be herein discussed with respect to the process involved are based upon the recovery of beryllium from this mineral. However, no limitation is intended to be implied from this fact, as the process depends for its successful use not upon the particular form of mineral which may be treated, but upon the fact that a beryllium bearing mineral in the presence of silica will under proper conditions react with a chlorid of the alkaline earth metals or a chlorid of the alkali metals, or a haloid of the alkaline earth metals or alkali metals having the properties of chlorin with respect to forming a volatilizable beryllium salt, which may be recovered in any of several ways.

The most common forms of a haloid such as before mentioned—which can be used are sodium chlorid and calcium chlorid, both of these substances being very plentiful and inexpensive materials with which to work.

The beryllium bearing mineral which as before stated, we will assume to be the mineral beryl, is suitably crushed, and heated to drive off the moisture that may be contained in it. To this mineral there is added calcium chlorid or sodium chlorid in proper quantity, as well as some carbon in finely divided form, the carbon having conducting property such for instance as coke. These materials being suitably mixed, are charged into a suitable furnace, which will develop sufficient heat to cause the reaction between the sodium chlorid or calcium chlorid as the case may be and the mineral containing beryllium. The carbon is used in this reaction merely as a conductor of the electric current, or rather, it is used to increase the conductivity of the mineral where the process is to be performed in an electric furnace, which type of furnace is the preferable form employed.

The heat required for the reaction to proceed is in the neighborhood of 1500° C. The reaction proceeds in accordance with the following:

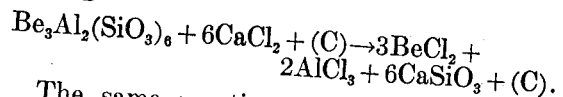

$$Be_3Al_2(SiO_3)_6 + 6CaCl_2 + (C) \rightarrow 3BeCl_2 + 2AlCl_3 + 6CaSiO_3 + (C).$$

The same reaction would take place if sodium chlorid were used.

The aluminium chlorid formed volatilizes at a temperature lower than that at which beryllium chlorid volatilizes and hence the aluminium chlorid and the beryllium chlorid may be separated from each other, by maintaining the temperature of the reaction at the temperature at which the aluminium chlorid will be volatilized, which will be in the neighborhood of 1200° C., but the beryllium chlorid will not. The aluminium chlorid thus volatilized is collected in any suitable manner and conducted from the furnace to a suitable condensing apparatus, wherein it will condense as a fine yellow powder. As soon as it is apparent that the aluminium chlorid is all volatilized, the temperature of the furnace is raised to a temperature at which the beryllium chlorid will be volatilized, and may be conducted from the furnace and recovered in a suitable condensing apparatus.

It will be apparent that if desired the temperature of the furnace may be in the first instance raised to the temperature at which beryllium chlorid volatilizes, and the combined aluminium and beryllium chlorids conducted from the furnace together and recovered by a fractional condensation, inasmuch as the chlorids condense at different temperatures.

The mineral beryl contains sufficient silica for the process of the reaction, but if it be desired to operate upon a mineral or other beryllium containing material which was deficient in silica, for the purposes of the process, it will be necessary to add silica to the furnace charge in the proportion necessary to make up the deficiency. On the other hand if perchance the beryllium containing mineral which it was desired to work upon should contain an excess of silica, which would usually be in the form of silicate, this excess of silica would be taken care of by the addition to the furnace charge of any of the well known basic fluxes, such as magnesium oxid, magnesium carbonate, calcium oxid, calcium carbonate, sodium carbonate, etc.

The quantity of haloid salt as well as the quantity of other reagents before mentioned, which should be added under given conditions for performing the process, will, of course, vary in accordance with the quantity of mineral treated, but the quantities may be determined from the proportions of the various materials which react in accordance with the empirical formula, expressing the chemical reaction between the beryllium bearing material and the haloid salt.

The process may be carried on as a two-step process if desired, as follows: the first step consisting in heating the beryllium mineral and the haloid salt together with carbon, with an under supply of the haloid salt, that is to say, sufficient haloid salt being added only to provide the necessary amount for the formation of the aluminium chlorid. Under such conditions the reaction will proceed as follows:—

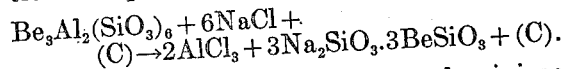
$$Be_3Al_2(SiO_3)_6 + 6NaCl + (C) \rightarrow 2AlCl_3 + 3Na_2SiO_3.3BeSiO_3 + (C).$$

Under these conditions the aluminium chlorid may be volatilized, conducted away from the furnace, and recovered, leaving in the furnace charge the beryllium in the form of a silicate.

After the aluminium chlorid has been thus removed the temperature of the furnace may be raised, and chlorin gas passed through the residue, with the addition of carbon, and the reaction will take place in accordance with the following:

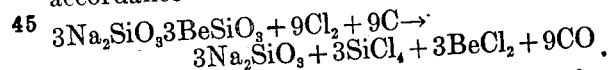
$$3Na_2SiO_3.3BeSiO_3 + 9Cl_2 + 9C \rightarrow 3Na_2SiO_3 + 3SiCl_4 + 3BeCl_2 + 9CO.$$

The temperature of the furnace may be maintained sufficiently high to volatilize the beryllium chlorid and the silicon tetrachlorid which may be conducted from the furnace and separated in an apparatus suitable for fractional condensation.

If desired the same result as expressed in the foregoing two-step process may be obtained as a single step operating the furnace at a sufficiently high temperature. The reaction will proceed as follows:

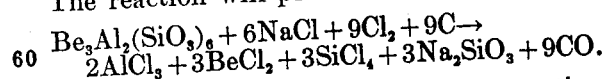
$$Be_3Al_2(SiO_3)_6 + 6NaCl + 9Cl_2 + 9C \rightarrow 2AlCl_3 + 3BeCl_2 + 3SiCl_4 + 3Na_2SiO_3 + 9CO.$$

In the process carried on by the reaction which has just been explained or when the process is carried on by the reaction earlier explained, the temperature of the furnace at which the reaction proceeds may be below that required to volatilize either aluminium chlorid or beryllium chlorid, but sufficiently high to cause the reaction to proceed. Under these circumstances the beryllium chlorid and the aluminium chlorid will remain in the mass of fused material, and the fused material may be disintegrated in any suitable manner, as by running the mass while still hot into a mass of cold water, and the chlorid recovered by the dissolving action of the water, which if desired may be acidulated. From the solution the chlorids may be separated and subsequently recovered.

There is another reaction in accordance with which the process may be performed, in which reaction the carbon added is made use of in the formation of carbids of beryllium and aluminium in the first instance, the carbids being in a second step in the process converted into haloid by the use of a suitable halogen. In this process the reaction proceeds in two steps as follows:

First:

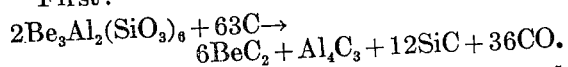
$$2Be_3Al_2(SiO_3)_6 + 63C \rightarrow 6BeC_2 + Al_4C_3 + 12SiC + 36CO.$$

This reaction may be allowed to proceed to its conclusion, and then immediately followed by causing chlorin gas to be passed to the heated mass. This causes the following reaction:

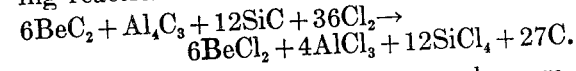
$$6BeC_2 + Al_4C_3 + 12SiC + 36Cl_2 \rightarrow 6BeCl_2 + 4AlCl_3 + 12SiCl_4 + 27C.$$

If desired these two steps may be combined as one by maintaining the temperature of the furnace sufficiently high for causing the complete reaction as follows:

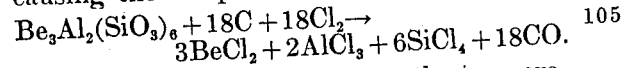
$$Be_3Al_2(SiO_3)_6 + 18C + 18Cl_2 \rightarrow 3BeCl_2 + 2AlCl_3 + 6SiCl_4 + 18CO.$$

When utilizing this reaction, the temperature at which the reaction is caused to proceed may be sufficiently high so that the chlorids of beryllium and aluminium are volatilized together, and subsequently recovered by a fractional condensation, or the reaction may be caused to proceed at such a temperature as will cause the aluminium chlorid to be first volatilized and after the complete volatilization of the aluminium chlorid, the temperature may be raised sufficiently high to cause the beryllium chlorid to be volatilized, and it in turn may be conducted from the furnace and recovered by suitable condensing apparatus. On the other hand, the temperature of the reaction may be maintained at such a degree as will be below the volatilizing temperatures of either of the chlorids mentioned, but sufficiently high to cause the reaction to proceed, in which event the chlorids of beryllium and aluminium will remain in the fused mass in the furnace at the conclusion of the process, and may be recovered by a suitable leaching process.

In the event that the material which enters into the furnace charge is not properly prepared by having the moisture removed therefrom, the chlorids of the halogen compounds of beryllium and aluminium will not be volatilized, but the presence of water will cause the chlorids to be hydrolyzed forming hydrochloric acid, which of course will pass off as a gas, and beryllium hydrate and aluminium hydrate, which substances are not volatile. If sufficient moisture be present to combine with all the beryllium chlorid and aluminium chlorid formed, of course the hydrolyzing action is complete. But if the amount of moisture be not sufficient for that purpose, the hydrolysis is only partial and some of the beryllium chlorid and aluminium chlorid may be volatilized.

Of course, if desired, a sufficient amount of moisture may be introduced into the furnace charge to cause a complete hydrolyzing action with respect to the beryllium chlorid and aluminium chlorid.

As stated in the early part of the specification the process while having special application to the recovery of beryllium from its ores, minerals or other materials that may contain it, in combination, yet I do not intend to limit the process to the recovery of beryllium alone, as other elements having properties similar to beryllium would respond to the process with equal facility.

In the claims, where the term "having silica present" is used, it is intended to cover the condition where the original ore, mineral, or material has silica present as a silicate, or otherwise, and also where silica is added to the furnace charge to form a part thereof.

Having described our invention, we claim:

1. The process for recovering beryllium from its ores which consists in preparing a furnace charge of the material to be treated in crushed form, adding a halogen salt of an alkaline earth metal or alkali metal, heating the same to a temperature at which reaction will proceed, and a haloid of beryllium be formed, and in recovering the said haloid of beryllium.

2. The process of recovering beryllium from ores, minerals and material containing the same which consists in providing a furnace charge consisting of the beryllium-containing material in crushed form, adding thereto a chlorid of an alkali metal or alkaline earth metal, heating the same to a temperature at which reaction proceeds and a chlorid of beryllium is formed and recovering the beryllium chlorid.

3. The process of recovering beryllium from ore, mineral or material containing the same which consists in preparing a furnace charge consisting of the beryllium containing material in crushed form, adding a haloid of an alkali metal or alkaline earth metal, heating the same to a temperature at which reaction proceeds and a beryllium haloid is formed, and sufficiently high to cause the beryllium haloid formed to volatilize and in conducting the volatilized haloid from the furnace, and subsequently recovering the same.

4. The process of recovering beryllium from ores, minerals and material containing the same, which consists in mixing with said material a halogen compound, subjecting the same to a sufficient temperature at which reaction proceeds and a haloid of beryllium is formed, and recovering the haloid of beryllium.

5. The process of recovering beryllium from ores, minerals and material containing the same, which consists in mixing with said material a chlorid which will react with the said material, subjecting the mixture to a temperature at which reaction proceeds and a chlorid of beryllium is formed, and in recovering the beryllium chlorid.

6. The process of recovering beryllium from ores, minerals and material containing the same, which consists in mixing with said material a haloid compound which will react with said material, having the said mixture in anhydrous condition, subjecting the mixture to a temperature at which reaction proceeds and a haloid of beryllium is formed, and in recovering the beryllium haloid.

7. The process of recovering beryllium from ores, minerals and material containing the same, which consists in mixing with said material a chlorid which will react with the said material, having the mixture in anhydrous condition, subjecting the mixture to a temperature at which reaction will proceed and a chlorid of beryllium be formed, and in recovering the beryllium chlorid.

8. The process of recovering beryllium from ores, minerals and material containing the same, which consists in mixing with said material a haloid compound which will react with the said material, having the mixture in anhydrous form, subjecting the mixture to a temperature at which reaction proceeds, and sufficiently high to volatilize the haloid of beryllium, and in recovering the said beryllium haloid.

9. The process of recovering beryllium from ores, minerals and material containing the same, which consists in mixing with said material a chlorid which will react with said material, having the mixture in anhydrous form, subjecting the mixture to a temperature at which reaction proceeds, and sufficiently high to cause volatilization of the beryllium chlorid which is formed, and in recovering the beryllium chlorid.

10. The process of recovering beryllium from ores, minerals, and material containing the same, which consists in mixing with the said material a halogen compound which will react with the said material, having silica present in the mixture, subjecting the mixture to a temperature at which reaction proceeds and a haloid of beryllium is formed, and in recovering the said beryllium haloid.

11. The process of recovering beryllium from ores, minerals and material containing the same, which consists in mixing with said material a chlorid which will react with the said material, having silica present in the mixture, subjecting the mixture to a temperature at which reaction will proceed and a chlorid of beryllium be formed, and in recovering said beryllium chlorid.

12. The process of recovering beryllium from ores, minerals and material containing the same, which consists in adding to said material a halogen compound which will react with the said material, having silica present in the mixture, having the mixture in anhydrous form, subjecting the mixture to a temperature at which reaction proceeds and sufficiently high to cause the haloid of beryllium formed to be volatilized, and recovering the said beryllium haloid.

13. The process of recovering beryllium from ores, minerals and material containing the same, which consists in mixing with the said material a chlorid which will react with the said material, having silica present in the mixture, having the mixture in anhydrous form, subjecting the mixture to a temperature at which reaction proceeds and the beryllium chlorid formed is volatilized, and in recovering the said beryllium chlorid.

14. The process of recovering beryllium from ores, minerals and material containing the same, which consists in mixing with said material a halogen compound of an alkaline earth metal or alkali metal, having silica present in the mixture, subjecting the mixture to a temperature at which reaction proceeds and a haloid of beryllium is formed, and in recovering the said beryllium haloid.

15. The process for recovering beryllium from ores, minerals and material containing the same, which consists in mixing with the said material a chlorid of an alkaline earth metal or alkali metal, having silica present in the mixture, subjecting the mixture to a temperature at which reaction proceeds and beryllium chlorid is formed, and in recovering the said beryllium chlorid.

16. The process of recovering beryllium from ores, minerals and materials containing the same, which consists in mixing with the said material a halogen compound of an alkaline earth metal or alkali metal, having silica present in the mixture, having the mixture in anhydrous form, subjecting the mixture to a temperature at which reaction proceeds and a haloid of beryllium is formed, and in recovering the said beryllium haloid.

17. The process of recovering beryllium from ores, minerals and material containing the same, which consists in mixing with said material a chlorid of an alkaline earth metal or alkali metal, having silica present in the mixture, having the mixture in anhydrous form, subjecting the mixture to a temperature at which reaction proceeds and beryllium chlorid is formed, and in recovering the said beryllium chlorid.

18. The process of recovering beryllium from ores, minerals and material containing the same, which consists in mixing with the said material a chlorid of an alkaline earth metal or alkali metal, having silica present in the mixture, having the mixture in anhydrous form, heating the said mixture to a temperature at which reaction proceeds and sufficiently high to volatilize the beryllium chlorid formed, and in recovering the volatilized beryllium chlorid.

19. The process of recovering beryllium from an ore, mineral or material containing the same which consists in heating the beryllium bearing material to the temperature of reaction and causing the same to react with a haloid whereby there is formed a haloid of beryllium, maintaining sufficient temperature to cause the haloid of beryllium to volatilize, conducting the volatilized beryllium haloid from the furnace, and in condensing the same.

In testimony whereof, we hereunto affix our signatures.

HAROLD S. BOOTH.
GEORGE G. MARSHALL.